United States Patent
Flannery et al.

(10) Patent No.: US 7,660,852 B2
(45) Date of Patent: Feb. 9, 2010

(54) MEETING STRUCTURES AND GLOBAL UNIQUE IDENTIFIERS

(75) Inventors: Eliot J. Flannery, Redmond, WA (US); Jeremy L. Dewey, Redmond, WA (US); Kanaka Komandur, Redmond, WA (US); Ryan Y. Kim, Sammamish, WA (US); Todd R. Manion, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 346 days.

(21) Appl. No.: 11/409,348

(22) Filed: Apr. 21, 2006

(65) Prior Publication Data

US 2007/0250641 A1    Oct. 25, 2007

(51) Int. Cl.
G06F 15/16 (2006.01)
G06F 12/00 (2006.01)
G06F 17/30 (2006.01)

(52) U.S. Cl. .................. 709/204; 707/200
(58) Field of Classification Search ............ None
See application file for complete search history.

(56) References Cited

U.S. PATENT DOCUMENTS

| | | | |
|---|---|---|---|
| 6,230,171 B1* | 5/2001 | Pacifici et al. ............ 715/201 |
| 6,259,701 B1 | 7/2001 | Shur et al. |
| 7,089,278 B1* | 8/2006 | Churchill et al. ......... 709/203 |
| 7,174,342 B1* | 2/2007 | Scheurich et al. ........ 707/102 |
| 2002/0066109 A1 | 5/2002 | Tam et al. |
| 2002/0076025 A1 | 6/2002 | Liversidge et al. |
| 2002/0120760 A1 | 8/2002 | Kimchi et al. |
| 2003/0023435 A1* | 1/2003 | Josephson ................ 704/235 |
| 2003/0232648 A1* | 12/2003 | Prindle ..................... 463/40 |
| 2004/0003039 A1 | 1/2004 | Humphrey et al. |
| 2004/0003045 A1* | 1/2004 | Tucker et al. ............. 709/205 |
| 2004/0010574 A1 | 1/2004 | Cammick et al. |
| 2004/0019487 A1* | 1/2004 | Kleindienst et al. ...... 704/270.1 |
| 2004/0019683 A1* | 1/2004 | Lee et al. ................. 709/227 |
| 2004/0059711 A1 | 3/2004 | Jandel et al. |
| 2004/0071099 A1* | 4/2004 | Costa-Requena et al. ... 370/260 |
| 2004/0133696 A1* | 7/2004 | Comstock et al. ........ 709/231 |
| 2004/0148333 A1* | 7/2004 | Manion et al. ........... 709/201 |
| 2004/0158586 A1* | 8/2004 | Tsai ......................... 707/200 |
| 2004/0162144 A1* | 8/2004 | Loose et al. .............. 463/42 |
| 2004/0205359 A1* | 10/2004 | Matsuhira ................. 713/201 |
| 2004/0267939 A1 | 12/2004 | Yumoto et al. |
| 2005/0034079 A1* | 2/2005 | Gunasekar et al. ....... 715/753 |
| 2005/0193099 A1* | 9/2005 | Reus et al. ................ 709/220 |

(Continued)

OTHER PUBLICATIONS

"Lotus Sametime 3.1 and Enterprise Metting Services 1.0" (hereinafter NPL), dated 2003, p. 3, 11, 17, 50, 52, 97.*

(Continued)

*Primary Examiner*—Neveen Abel Jalil
*Assistant Examiner*—Tarek Chbouki
(74) *Attorney, Agent, or Firm*—Marshall, Gerstein & Borun LLP

(57) ABSTRACT

A series of unique records may be published to establish and maintain ad hoc or online meetings on a peer-to-peer network. The published records include a creator record, a presentation record, a file sharing record, a friendly name record, and invitation status record, a capabilities record, and a presence record. Each of the published records has a global unique identifier (GUID) a uniquely and universally identifies each of the record types.

14 Claims, 8 Drawing Sheets

U.S. PATENT DOCUMENTS

2005/0228853 A1* 10/2005 Yamamura et al. .......... 709/200
2005/0289471 A1 12/2005 Thompson et al.
2006/0007900 A1 1/2006 Sylvain
2006/0242583 A1* 10/2006 MacNaughton et al. ..... 715/733
2007/0050450 A1* 3/2007 Manion et al. .............. 709/204
2007/0143398 A1* 6/2007 Graham ...................... 709/204

OTHER PUBLICATIONS

Mark A. Miller, P.E, Managing Call Flows Using H.323, Jun. 24, 2002, p. 6.*

"AComponentBasedCollaborationInfrastructure", dated Nov. 10, 2005.*

"CollaborationDistributedSoftwareEngineering", dated Apr. 28, 2004.*

"ToolsforCollaborativesoftwareDesign", dated Jan. 21, 2003.*

Dimitrov, et al., "WSMO Studio—Requirements and Specification," 33 pages dated Feb. 23, 2005.

Ehnrot, et al., "Automatic Generation of Distributed Dynamic Applications in a Thin Client Environment," *Lund Institute of Technology/Caleigo*, 97 pages dated Feb. 2003.

Sauermann, "The Semantic Desktop—a Basis for Personal Knowledge Management," *Proceedings of I-KNOW '05*, pp. 294-301.

* cited by examiner

MEETING STRUCTURES AND GLOBAL UNIQUE IDENTIFIERS

BACKGROUND

Peer-to-peer networking supports the notion of ad hoc meetings and online groups. Techniques for creating and managing such online groups and ad hoc meetings have varied over time, creating issues for comprehensive meeting management.

SUMMARY

A series of records published in conjunction with online meetings are disclosed which allow comprehensive management of meeting creation and execution. The published records include a creator record, a presentation record, a file sharing record, a friendly name record, and invitation status record, a capabilities record, and a presence record. Each of the records has a version identifier that distinguishes it from other records of the same type associated with the same meeting and a global unique identifier (GUID) that distinguishes each of the record types from each of the other record types. Because each record type is uniquely identified by this GUID, published record identification is simplified and common across platforms and networks.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
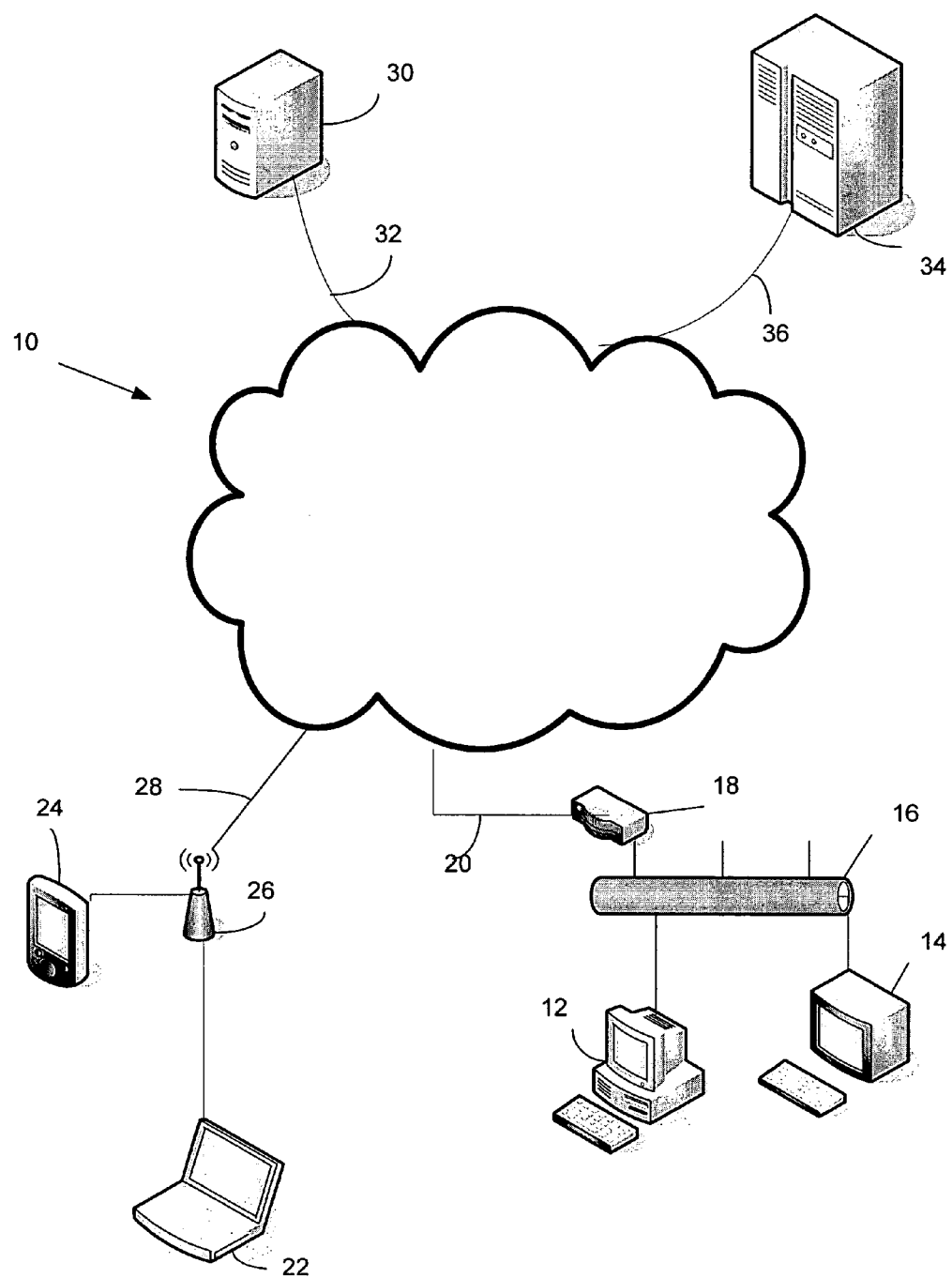
FIG. 1 is a simplified and representative block diagram of a computer network.

FIG. 1 illustrates a network 10 with a number of computers, or endpoints, that may participate in a peer-to-peer network online group or ad hoc meeting. The network 10 may be the Internet, a virtual private network (VPN), or any other network that allows one or more computers, communication devices, databases, etc., to be communicatively connected to each other. The network 10 may be connected to a computer 12, such as a personal computer and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30, such as a proxy server or edge server may be connected to the network 10 using a communication link 32 and a web server 34 may be connected to the network 10 using another communication link 36.

Figure 2:
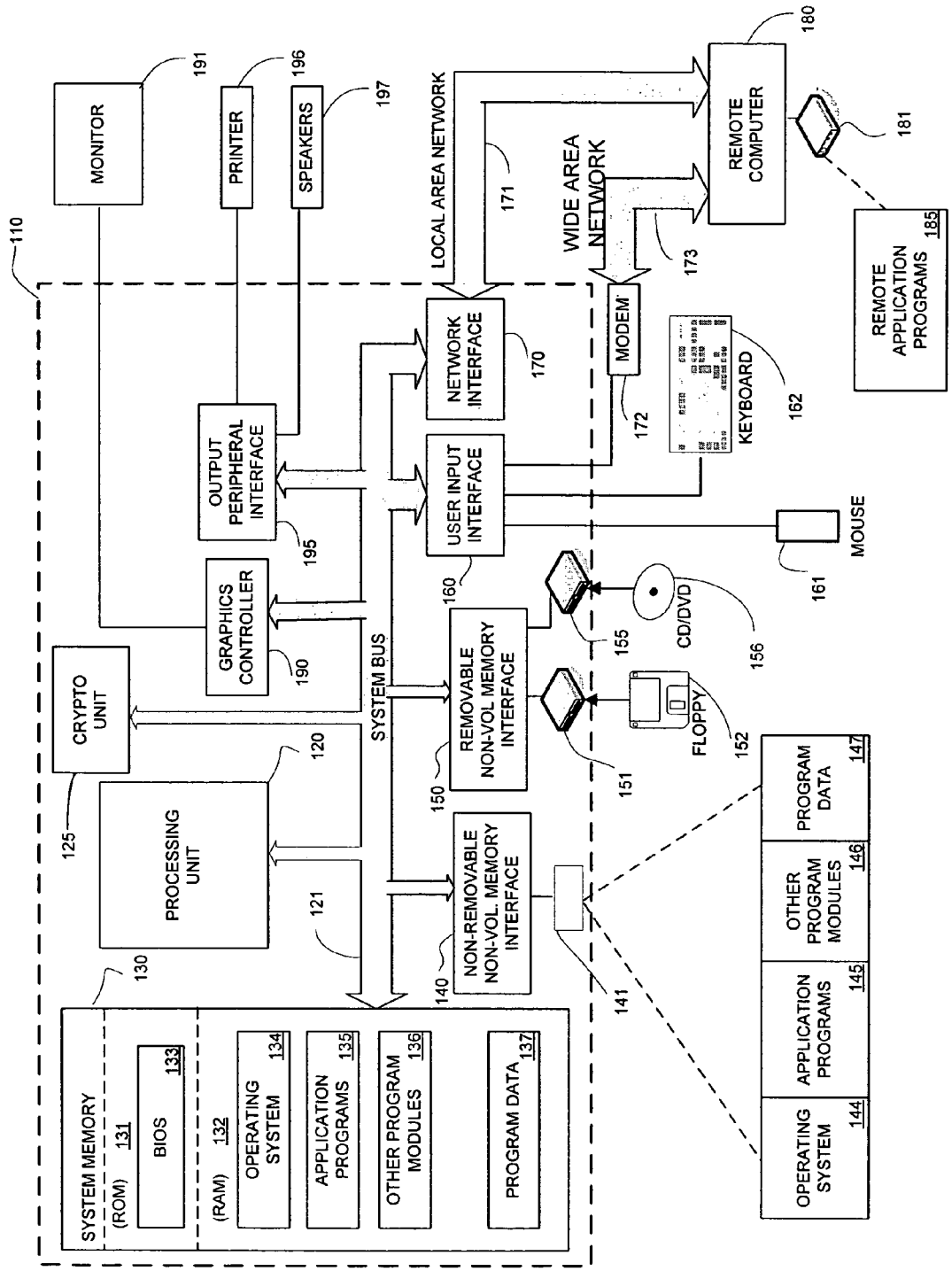
FIG. 2 is a simplified and representative block diagram of a computer.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may also include a cryptographic unit 125. The cryptographic unit 125 may have a calculation function that may be used to verify digital signatures, calculate hashes, digitally sign hash values, and encrypt or decrypt data. The cryptographic unit 125 may also have a protected memory for storing keys and other secret data, such as an identification indicia, for example, an identifier representative of the computer or processing unit 120. Another function supported by the cryptographic unit 125 may be digital rights management, that in its simplest form is a variation of encryption. The cryptographic unit may also include a timer or clock (not depicted) to support expiration dates and some usage limits. The cryptographic unit may be physically located within the processing unit 120 or may be a separate component within the computer 110. In other embodiments, the functions of the cryptographic unit may be instantiated in software and run via the operating system.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 3:
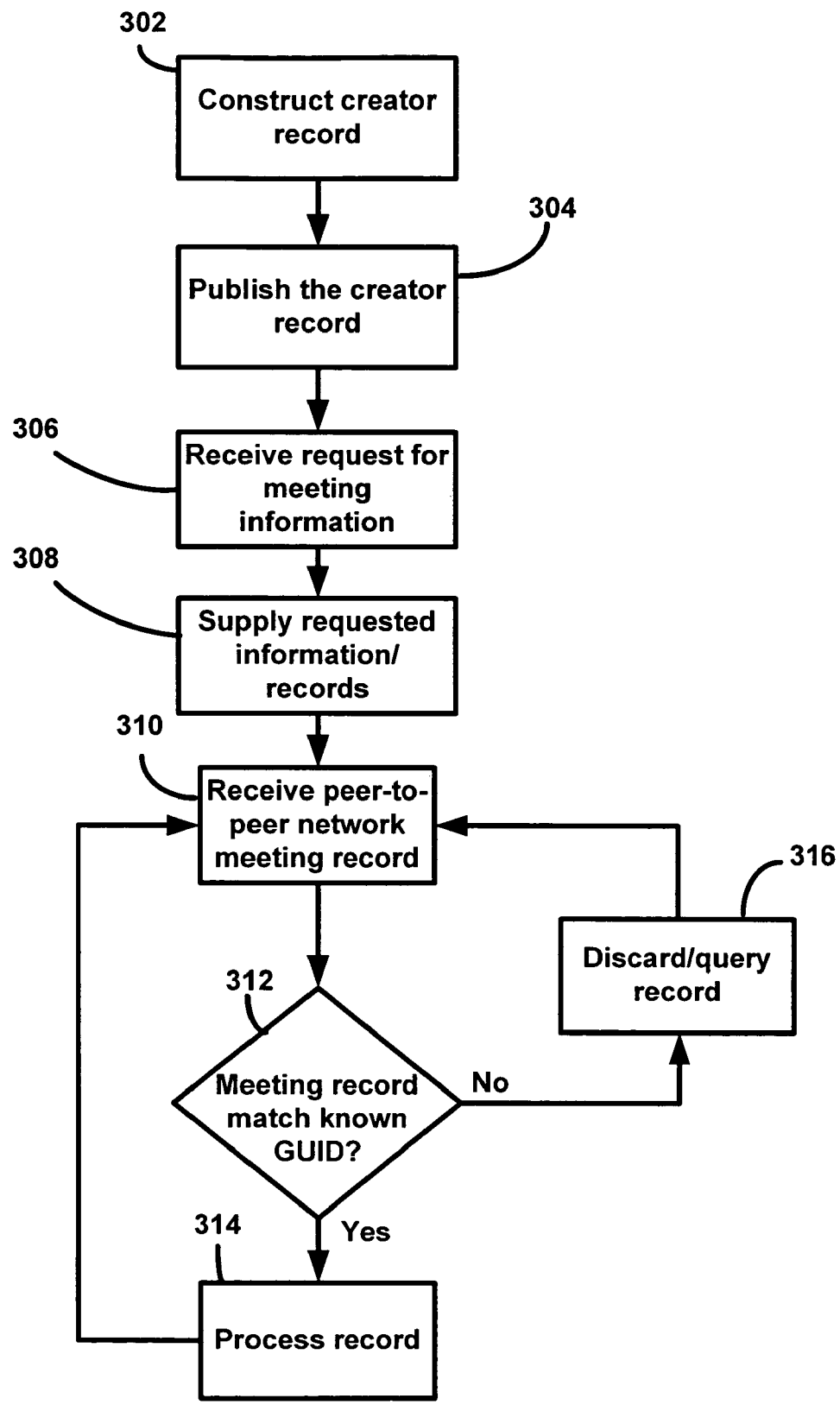
FIG. 3 is a flow chart depicting a method for using peer-to-peer network on-line group identifiers.

FIG. 3 is a method of creating and maintaining a peer-to-peer network on-line group or meeting. At block 302, a creator record is constructed by an electronic device, such as laptop 22 of FIG. 1, or another peer-to-peer network endpoint wishing to establish an on-line group. The on-line group may be created to support an on-line meeting or other purpose, such as resource sharing. The creator record includes a version identifier, a group global unique identifier (GUID) that is generated to uniquely identify the on-line group. The creator record may also include a hash of the password required for an invitee to supply to join the meeting. In many cases, a password, if required, is supplied out-of-band to meeting invitees. The creator record is identified by a creator record GUID. The creator record GUID is used by other peer-to-peer network devices or endpoints to universally identify or recognize a creator record.

Figure 4:
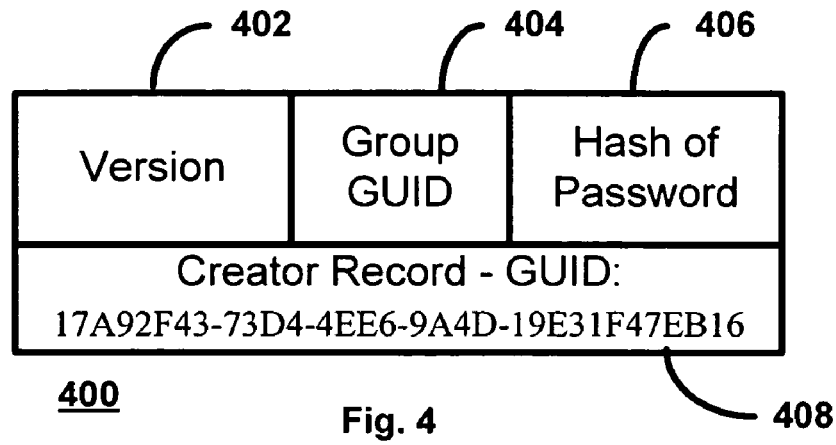
FIG. 4 is a layout of a representative peer-to-peer network creator record.

At block 304, a creator record 400 may be published for other peer-to-peer network endpoints to receive and review. Turning briefly FIG. 4, a depiction of the creator record 400 is shown. Because the creator record GUID 408 uniquely classifies the creator record 400, the creator record 400 is readily recognizable when published on a peer-to-peer network, such as may embodied in network 10 of FIG. 1. The creator record 400 may include a double length word version identifier 402, a group GUID 404, that may be used to identify a particular ad hoc group or online meeting. The creator record 400 may also include a byte value of the hash of a password 406. The password hash may use any hash algorithm known in the art, such as MD5 or SHA-2. The creator record GUID 408 may be 17A92F43-73D4-4EE6-9A4D-19E31F47EB16.

Other peer-to-peer network endpoints, or nodes, may request more information regarding the peer-to-peer group at block 306. The information may be supplied at block 308 and may include out-of-band responses, for example, passwords, or may include in-band information, including other records related to the peer-to-peer group, several of which are discussed below. Once the meeting is established, peer group participation may continue by sharing files, passing notes, sharing displayed information (whiteboarding), etc. Any peer may initiate an activity by publishing the appropriate meeting record. The meeting records described below provide support for such meeting activities.

At block 310, the peer-to-peer endpoint may receive notice that a peer-to-peer network meeting record has been published. The meeting record may contain information about attendees or may contain information about data considered relevant to the purpose of the group. At block 312, the meeting record GUID may be examined to determine its identity. If the meeting record GUID is known, that is, matched from a list of known GUIDs, the 'yes' branch from block 312 may be taken to block 314, where the meeting record may be processed in keeping with the purpose of the meeting record. When the meeting record GUID is not matched from a list of known GUIDs, the 'no' branch may be followed from block 312 to block 316, where the meeting record may be discarded or the GUID may be researched to try to determine its nature. Alternately, a meeting record with an unknown GUID may be examined to determine if information in the meeting record may be helpful in determining its function or role.

After processing at either block 314 or 316, the peer-to-peer network endpoint may wait for further meeting records to be published at block 310. An exemplary list of meeting records that may be used subsequent to publishing the creator record are described below with respect to FIGS. 5-13.

Figure 5:
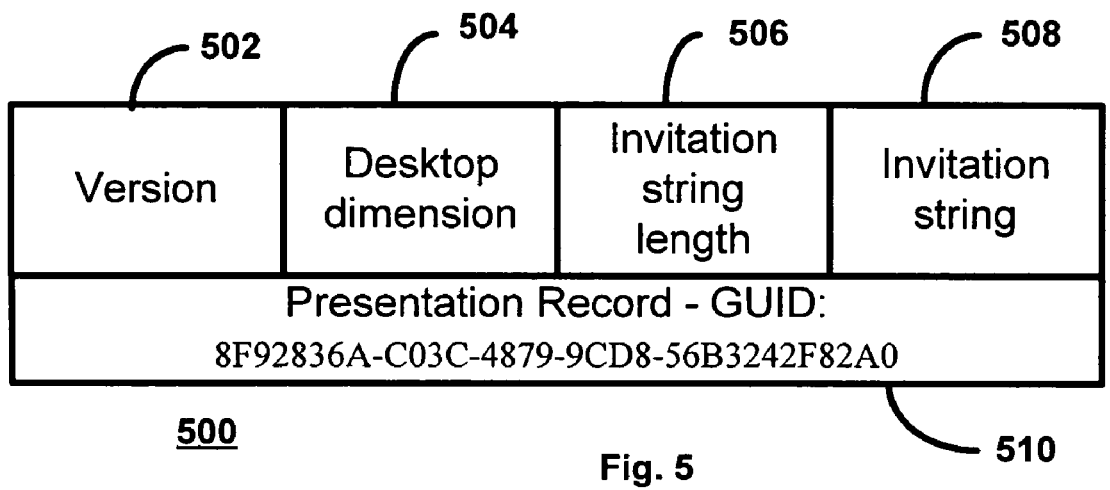
FIG. 5 is a layout of a representative peer-to-peer network presentation record.

FIG. 5 depicts a representative structure for a presentation record 500. The presentation record 500 may be published whenever a presentation is shared, allowing other participants to receive and display the presentation. Additionally, the presentation record 500 may include information 504 corresponding to the size of the presenter's desktop (i.e. the number of pixels on the presenter's display) for use by a recipient to calculate an appropriate aspect ratio for its own displayed version of the presentation. The presentation record 500, as with all meeting records discussed herein, may have a double-word type version reference 502 that may be used to distinguish this version of the presentation record 500 from another, e.g. a first presentation record from a second presentation record associated with the same ad hoc meeting. The presentation record 500 may have a field indicating the length of an attached invitation string 506 and the invitation string itself 508. The presentation record may have a global unique identifier 510 of 8F92836A-C03C-4879-9CD8-56B3242F82A0.

Figure 6:
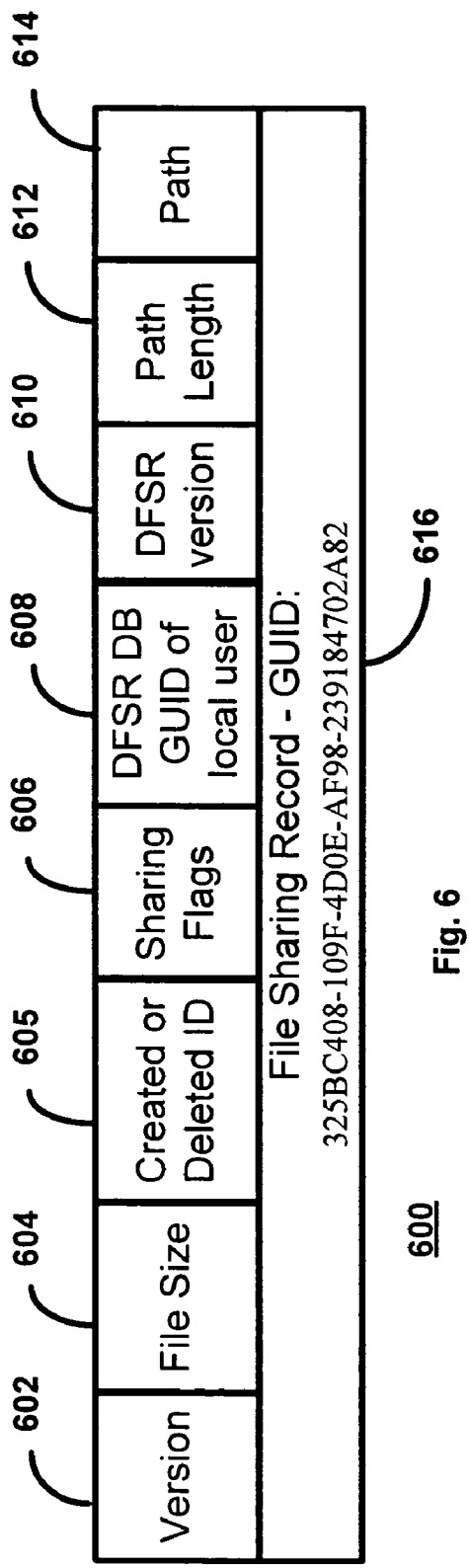
FIG. 6 is a layout of a representative peer-to-peer network file sharing record.

FIG. 6 depicts a representative structure for a file sharing record 600. The file sharing record 600 may be published when an endpoint wishes to make available a file for other members to download. The file sharing record 600 may have a double word type version identifier 602, a file size identifier 604 corresponding to the size of the shared file, an identifier 605 for the person who created or deleted the file to be shared, and flags 606 related to the file status. The flags 606 may include individual bits (not depicted) to indicate whether the file is deleted or not, whether the creator is still in the meeting or not, and whether the file has been re-added after being previously deleted. The file sharing record 600 may have two fields related to distributed file sharing replication (DFSR). The first of the two, a database GUID field 608 may include the GUID of the DFSR for the local user. The second, a version number of the DFSR Information Record 610, may be read from the version field of the DFSRInfo Record (see description below). The file sharing record 600 may also include a double word type field indicating the pathname block size 612, and another field with the pathname 614 pointing to the file being shared. The file sharing record 600 may have a global unique identifier 616 of 325BC408-109F-4D0E-AF98-239184702A82.

Figure 7:
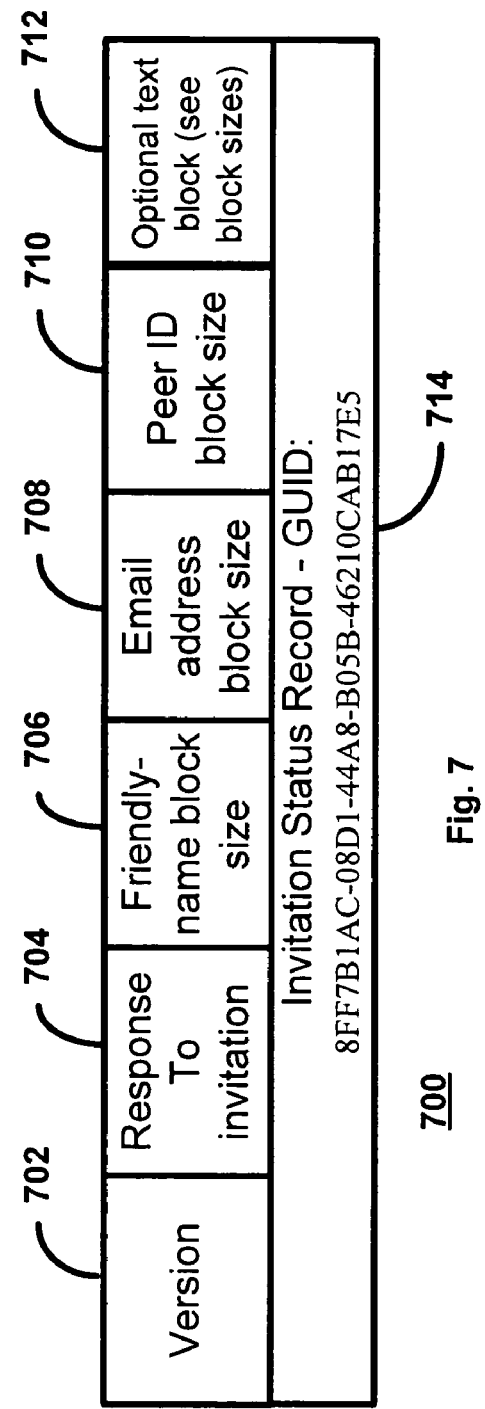
FIG. 7 is a layout of a representative peer-to-peer network invitation status record.

The invitation status record 700 is shown in FIG. 7. The invitation status record 700 may be published whenever an invitation is sent, notifying other members about an ongoing invitation process. The user-interface of a group member may use this information to place a grayed or ghosted image representing the invited party. The ghosted image may be "unghosted" when an invitee joins the ad hoc meeting and a presence record is published (see below). The invitation status record may include a version identifier 702, a response field 704 indicating whether the invitation has been accepted, and an indication 712 of whether the invitation was successfully sent. The invitation status record may also include optional text fields for friendly name, e-mail address, and peer ID 712. When any of the optional text fields are present, the invitation status record may include block sizes 706 708 710 to indicate the size, and, by calculation, the location of the optional text field relative to the beginning of the record. The global unique identifier 714 for the invitation status record may be 8FF7B1AC-08D1-44A8-B05B-46210CAB17E5.

Figure 8:
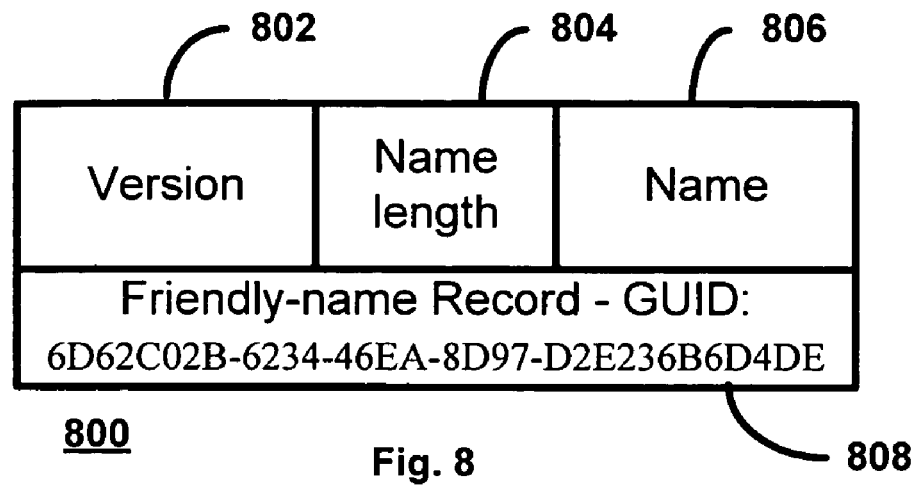
FIG. 8 is a layout of a representative peer-to-peer network friendly-name record.

FIG. 8 depicts a friendly name record 800. A friendly name may be used to identify a participant by his, her, or its common name or a nickname, as opposed to a peer group identifier or other machine-oriented ID. The friendly name record 800 may include a version identifier 802, a field indicating the length of the friendly name 804, and the friendly name 806 itself. The friendly name record global unique identifier 808 may be 6D62C02B-6234-46EA-8D97-D2E236B6D4DE. in another embodiment, the friendly name record 800 may not be supported. Instead, a friendly name element may be added to a presence record 900, described immediately below.

Figure 9:
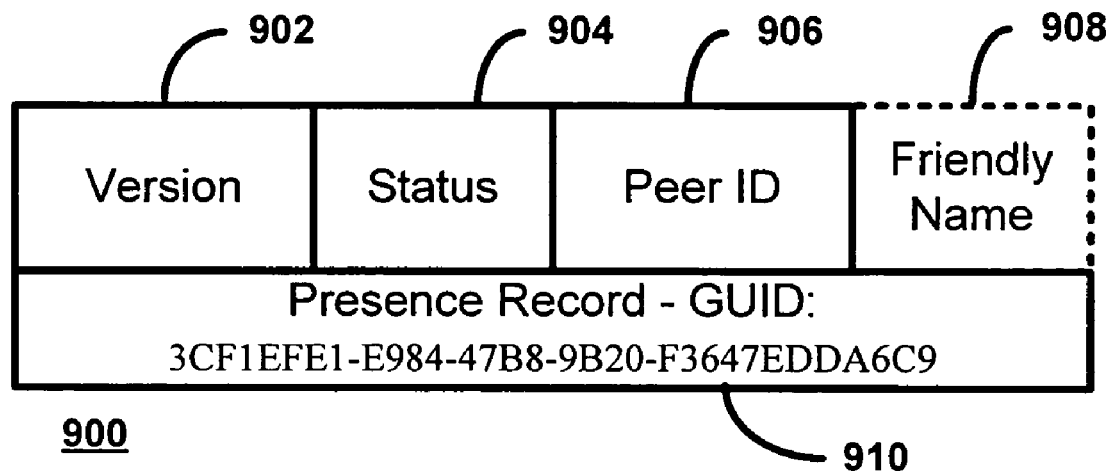
FIG. 9 is a layout of a representative peer-to-peer network presence record.

FIG. 9 depicts an exemplary presence record 900. The presence record 900 may have a double word type version identifier 902, a peer ID 906 indicating an invited party whose presence is being published, and a status field 904 indicating whether the invited party has been invited, has joined, or has refused to join the ad hoc meeting or online group. The record may be updated each time a participant's status changes. An optional element to the presence record 900 is a friendly name identifier 908. The friendly name identifier 908 may be used to identify a participant by his, her, or its common name or nickname instead of a potentially more cumbersome peer group identifier or other machine-oriented identifier. When the friendly name record 800 is not used, the friendly name may be published using the friendly name element 908. The presence record global unique identifier 910 may be 3CF1EFE1-E984-47B8-9B20-F3647EDDA6C9.

Figure 10:
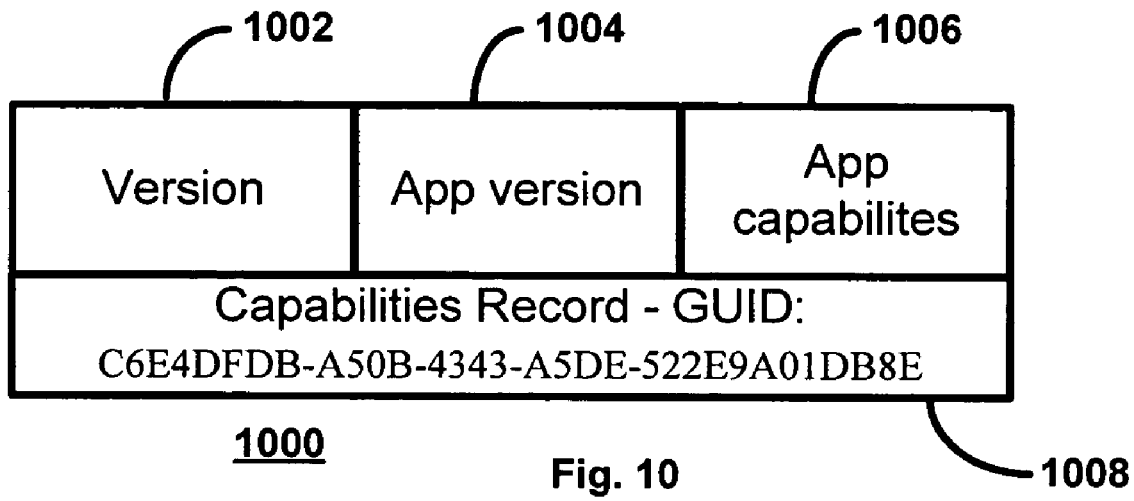
FIG. 10 is a layout of a representative peer-to-peer network capabilities record.

FIG. 10 depicts a capabilities record 1000. The capabilities record 1000 may be published to indicate the capabilities, or version number, of an application being launched to support a presentation or file sharing. The capabilities record 1000 may include a version identifier 1002 of the capabilities record itself and a field 1004 indicating the version of the application being launched, for example, version 1.0 may be represented by a high byte of 1 and a low byte of 0. An application capabilities element 1006 may be used to indicate particular capabilities of the application being employed, for example, whether it supports notes, or network-related features, such as, remote desktop protocol (RDP) or file replication service (FRS). A global unique identifier 1006 of the capabilities record 1000 may be C6E4DFDB-A50B-4343-A5DE-522E9A0 DB8E.

Figure 11:
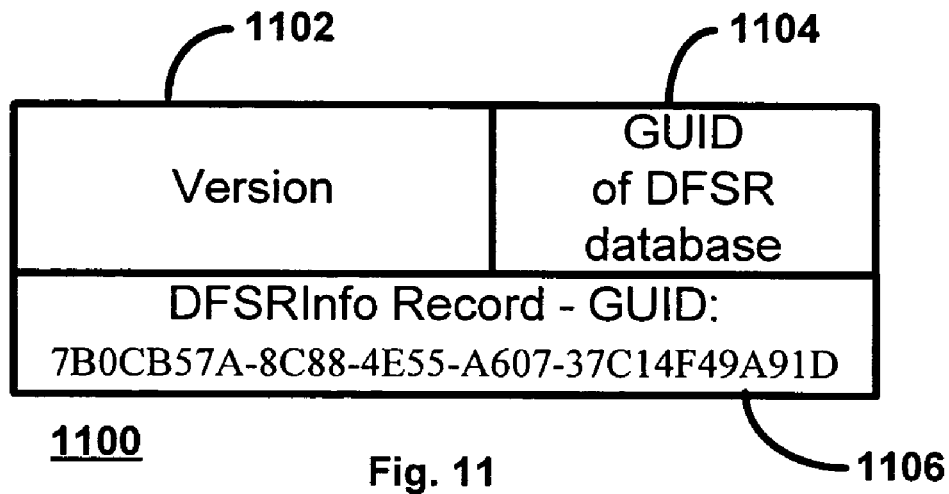
FIG. 11 is a layout of a representative peer-to-peer network DFSRInfo record.

FIG. 11 depicts a Distributed File System Replication Information Record 1100 (DFSRInfo Record). The DFSRInfo Record 1100 is used to publish information about the user's own DFSR database GUID, when available, and is published at the time a user creates or joins a session or meeting. The DFSRInfo Record 1100 may include a version identifier 1102 that indicates the version of the record 1100 itself. The DFSRInfo Record 1100 may also include a GUID 1104 of the DFSR database. A global unique identifier 1106 of the DFSRInfo Record 1100 may be 7B0CB57A-8C88-4E55-A607-37C14F49A91D. Note that the DFSRInfo Record 1100 has a GUID 1106 that identifies the record 1100, while one of the DFSRInfo Record fields 1104 contains a GUID of a related DFSR database. The two are separate and are not causally related.

Figure 12:
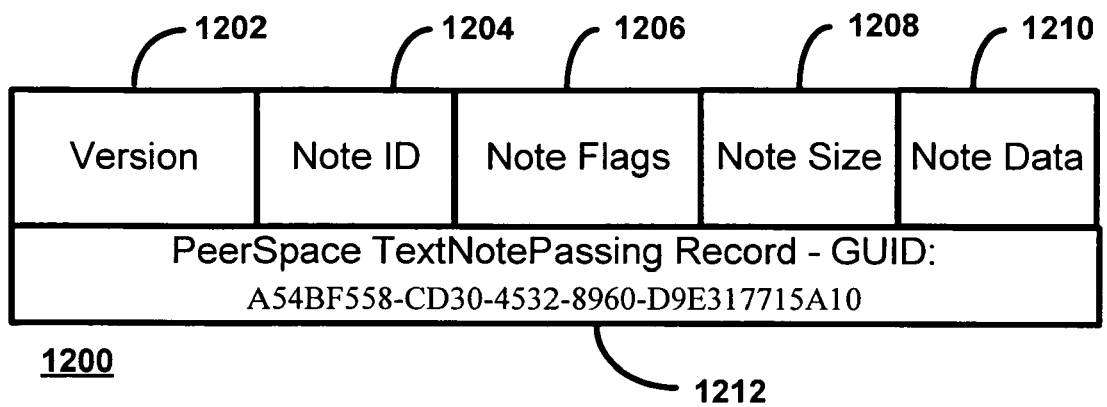
FIG. 12 is a layout of a representative peer-to-peer network PeerSpaceTextNotePassing record.

FIG. 12 depicts a PeerSpaceTextNotePassing (text note) record 1200 used to publish a text node for passing to a participant. The text note record 1200 may include a version identifier 1202 that indicates the version of the record 1200 itself. A note ID 1204 identifies a particular note and may be used by a recipient to acknowledge receipt of the text note record 1200. A note flag element 1206 may be used to indicate special features of the text note, for example, a lower bit may indicate whether the text is constructed right-to-left or left-to-right. A note size indicator 1208 may be used to indicate the block size of the appended text note. The note size indicator 1208 may also include the size of any NULL or padding characters if used. The note text 1210 may be attached. A globally unique identifier 1212, used to identify the record, may be A54BF558-CD30-4532-8960-D9E317715A10.

Figure 13:
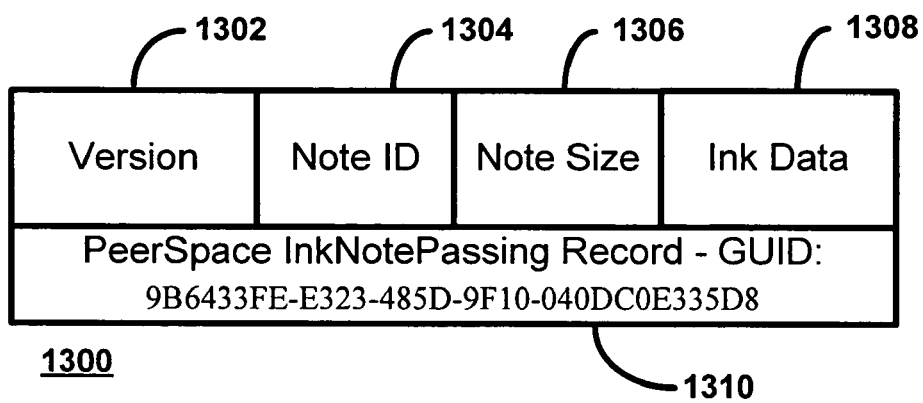
FIG. 13 is a layout of a representative peer-to-peer network PeerSpaceInkNotePassing record.

FIG. 13 depicts a PeerSpaceInkNotePassing (ink note) record 1300. The ink note record 1300, similar to the text note record 1200 above, may be used to pass drawings or free hand notes to a participant. The ink note record 1300 may include a version identifier 1302 to identify the version of the ink note record 1300 itself. A note identifier 1304 may be used to identify the note record and may be used by a recipient to acknowledge receipt of the note. A note size element 1306 may be used to indicate the size in bytes of the associate ink note binary object. The ink note data 1308 may be appended to the rest of the record. A global unique identifier (GUID) 1310 may be used to uniquely identify the ink note type. The record may be uniquely identified by a combination of the GUID, the version 1302, and the note ID 1304. In one embodiment, the GUID for PeerSpaceInkNotePassing record 1300 is 9B6433FE-E323-485D-9F10-040DC0E335D8.

Figure 14:
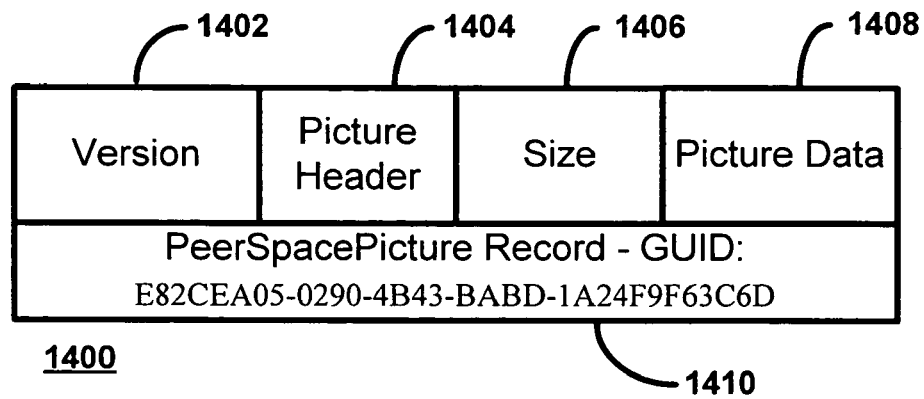
FIG. 14 is a layout of a representative peer-to-peer network PeerSpacePicture record.

FIG. 14 depicts a PeerSpacePicture (picture) record 1400. The picture record 1400, similar to the above, may be used to pass image media to a participant, for example, bitmap images, movies, or other media. The picture record 1400 may include a version identifier 1402 related to the picture record 1400 itself. The picture record 1400 may also include picture header data 1404 as well as size information 1406 for use by an application or utility displaying the picture. Picture data 1408 may be appended to the record. The PeerSpacePicture record 1400 may be identified by a global unique identifier of E82CEA05-0290-4B43-BABD-1A24F9F63C6D.

The process of using standardized records for peer-to-peer network meeting creation and setup, as well as uniquely identifying each record type using a common GUID values adds a useful resource for both programmers and users wishing to use on-line groups and ad hoc meetings to support both enterprise and recreational activities.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of establishing and participating in an on-line group at a peer-to-peer network endpoint comprising:
   requesting a creator record identified by a creator record global unique identifier (GUID), the creator record including a creator record version reference, a group GUID identifying the on-line group and an optional hash of a password;

receiving the creator record responsive to the request and storing the creator record on a computer-readable storage medium;

establishing a peer-to-peer network connection with the on-line group identified by the group GUID receiving a file sharing record identified by a file sharing record GUID to identify a file shared in the on-line group, the file sharing record comprising a file sharing record version reference corresponding to a version of the file sharing record; a file size identifier; an identifier of an entity that creates or deletes the file; sharing flags indicating if the file has been deleted, when the file creator is still a participant in the on-line meeting, and when the file has been re-added after being deleted; a distributed file sharing replication (DFSR) database GUID related to an available DFSR database, a DSFR version number indicating the version of a corresponding DFSR information record; a path to the file; and a length of the path;

fetching the file from the location indicated at the path to the file;

displaying the file;

receiving a presentation record identified by a presentation record GUID to receive a presentation shared in the on-line group, the presentation record comprising a presentation version reference corresponding to a version of the presentation record, a presentation dimension, an invitation, and an invitation length; and requesting the presentation identified by the presentation record GUID;

calculating an output setting based on the presentation dimension;

receiving an invitation status record identified by a invitation status record GUID to track an invitation to join the on-line group, the invitation status record comprising an invitation status record version reference corresponding to a version of the invitation status record, a response field, a success field indicating successful receipt of the invitation status record, an optional field comprising at least one of a friendly-name, an email address, and a peer identifier, and, when the at least one element of the optional field is present, an offset indicator indicating a respective staffing point for the at least one of the friendly-name, the email address, and the peer identifier;

displaying an icon representing the invitation;

updating the response field when the invitation is accepted;

receiving a friendly-name record identified by a friendly-name record GUID, to publish a friendly-name of a participant, the friendly-name record comprising a friendly-name record version reference corresponding to a version of the friendly-name record, a friendly-name string length, and the friendly-name of the participant;

updating a display of on-line group attendees with the friendly-name;

receiving a presence record identified by a presence-record GUID to identify invited peers and joined peers, the presence record comprising a presence record version reference corresponding to a version of the presence record, a status record, and a participant peer identifier;

updating a display of invited peers and a joined peers corresponding to the status record and the participant peer identifier receiving a capabilities record identified by a capabilities-record GUID to identify a version of an application used in information sharing in a peer-to-peer on-line group, the capabilities record comprising a capabilities version reference corresponding to a version of the capabilities record and a capabilities record corresponding to the version of the application; and determining a local ability to support the information sharing in the peer-to-peer on-line group based on the capabilities record and a local application version.

2. The method of claim 1, wherein the creator record GUID has a value of 17A92F43-73D4-4EE6-9A4D-19E3 1F47EB16.

3. The method of claim 1, wherein the presentation record GUID has a value of 8F92836A-C03C-4879-9CD8-56B3242F82A0.

4. The method of claim 1, wherein the file sharing record GUID has a value of 325BC408-109F-4D0E-AF98-239184702A82.

5. The method of claim 1, wherein the invitation status record GUID has a value of ff7b1ac-08d1-44a8-b05b-46210cab17e5.

6. The method of claim 1, wherein the friendly-name record identified by the friendly-name record GUID has a value of 6D62C02B-6234-46EA-8D97-D2E236B6D4DE.

7. The method of claim 1, wherein the presence-record GUID has a value of 3CF1EFE1-E984-47B8-9B20-F3647EDDA6C9.

8. The method of claim 1, wherein the capabilities-record GUID has a value of C6E4DFDB-A50B-4343-A5DE-522E9A01DB8E.

9. The method of claim 1, further comprising:

receiving a Distributed File System Replication information record identified by a Distributed File System Replication Information (DFSR) record GUID having a value of 7B0CB57A-8C88-4E55-A607-37C14F49A91D for use in determining information about a DFSR GUID and a corresponding DFSR database, the DFSR Information record comprising a DFSR information record version reference corresponding to a version of the DSFR information record and a GUID corresponding to the GUID of the DSFR database of an on-line group participant.

10. The method of claim 1, further comprising:

receiving a PeerSpaceTextNotePassing record identified by a PeerSpaceTextNotePassing record GUID having a value of A54BF558-CD30-4532-8960-D9E317715A10 for use in making available notes to the on-line group, the PeerSpaceTextNotePassing record comprising a version identifier, a note identifier corresponding to the note, note flags corresponding to features of the note, a note size identifier, and note data.

11. The method of claim 1, further comprising a PeerSpaceInkNotePassing record identified by a PeerSpaceInkNotePassing record GUID having a value of 9B6433FE-E323-485D-9F10-040DC0E335D8 for use in making available ink notes to the on-line group, the PeerSpaceInkNotePassing record comprising a version identifier, an ink note identifier corresponding to the ink note, an ink note size identifier, and ink note data.

12. The method of claim 1, further comprising a PeerSpacePicture record identified by a PeerSpacePicture record GUID having a value of E82CEA05-0290-4B43-BABD-1A24F9F63C6D for use in making available image media to the on-line group, the PeerSpacePicture record comprising a version identifier, image header information corresponding to a type and size of the image media, a image media size identifier, and image media data.

13. A computer-readable storage medium having computer executable instructions for processing information corresponding to creating and maintaining a peer-to-peer network on-line group comprising:

a module for creating and publishing a creator record identified by a creator record global unique identifier (GUID), the creator record including a creator record version reference, a group GUID identifying the on-line group, and an optional hash of a password;

a module for processing a file sharing record, wherein the file sharing record is identified by a file sharing record GUID for use in identifying a file shared in the on-line group, the file sharing record comprising a file sharing record version reference corresponding to a version of the file sharing record; a file size identifier; an identifier of an entity that creates or deletes the file; sharing flags indicating if the file has been deleted, if the file creator is still a participant in the on-line meeting, and if the file has been re-added after being deleted; a distributed file sharing replication (DFSR) database GUID related to an available DFSR database, a DSFR version number indicating the version of a corresponding DFSR information record; a path to the file; and a length of the path;

a module for fetching the file from the location indicated at the path to the file and displaying the file;

one or more modules for processing peer-to-peer network on-line group records comprising a presentation record, invitation status record, a friendly-name record, a presence record, a capabilities record.

14. The computer-readable storage medium of claim 13, wherein the creator record has a value of 17A92F43-73D4-4EE6-9A4D-19E31F47EB16, the presentation record has a GUID of 8F92836A-C03C-4879-9CD8-56B3242F82A0, the file sharing record has a GUID of 325BC408-109F-4D0E-AF98-239184702A82, the invitation status record has a GUID of 8FF7B1AC-08D1-44A8-B05B-46210CAB17E5, the friendly-name record has a GUID of 6D62C02B-6234-46EA-8D97-D2E236B6D4DE, the presence record has a GUID of 3CF1EFE1-E984-47B8-9B20-F3647EDDA6C9, the capabilities record has a GUID of C6E4DFDB-A50B-4343-A5DE-522E9A01DB8E, and the Distributed File System Replication Information record has a GUID of 7B0CB57A-8C88-4E55-A607-37C14F49A91D.

* * * * *

UNITED STATES PATENT AND TRADEMARK OFFICE
CERTIFICATE OF CORRECTION

| | | |
|---|---|---|
| PATENT NO. | : 7,660,852 B2 | Page 1 of 1 |
| APPLICATION NO. | : 11/409348 | |
| DATED | : February 9, 2010 | |
| INVENTOR(S) | : Eliot J. Flannery et al. | |

It is certified that error appears in the above-identified patent and that said Letters Patent is hereby corrected as shown below:

In column 9, line 25, in Claim 1, delete "file;" and insert -- file: --, therefor.

In column 9, line 46, in Claim 1, delete "staffing" and insert -- starting --, therefor.

Signed and Sealed this
Eighth Day of February, 2011

David J. Kappos
*Director of the United States Patent and Trademark Office*